Figure 1:
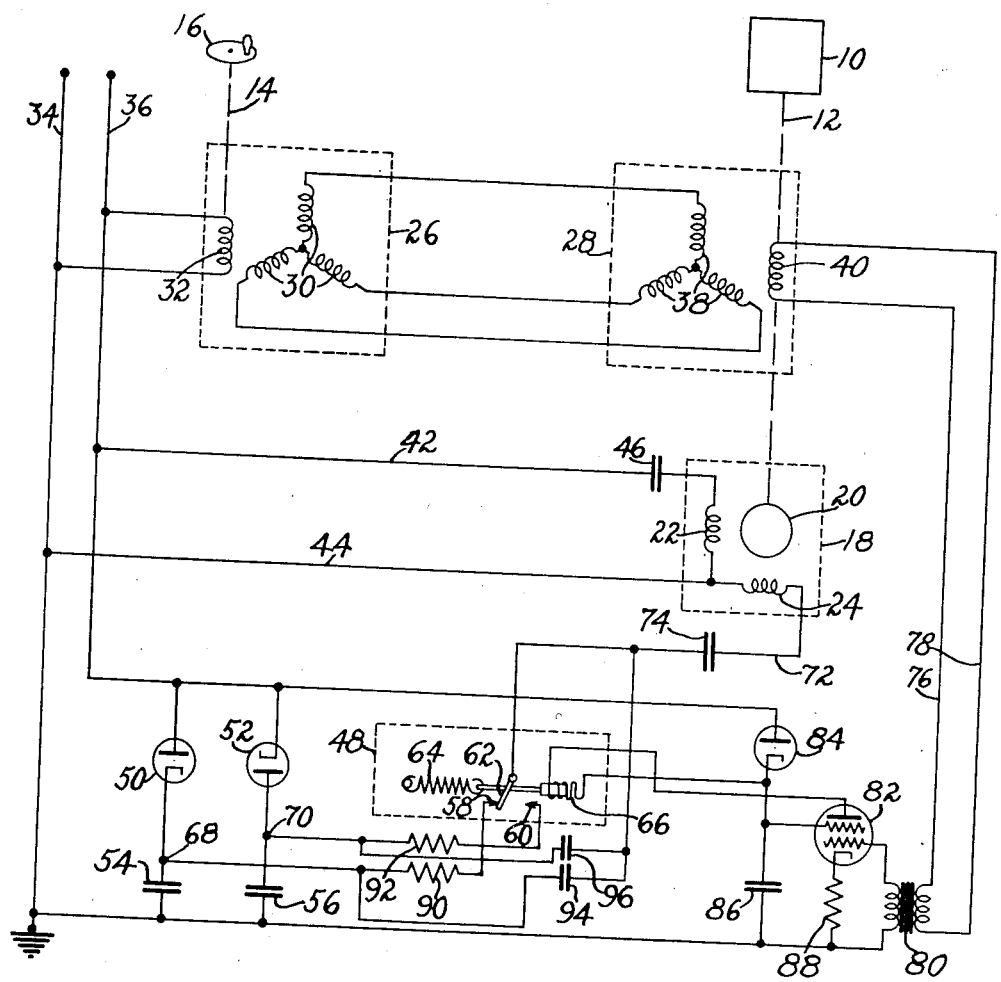

Inventor
William O. Gates
By his Attorney

Inventor
William O. Gates
By His Attorney

Inventor
William O. Gates
By His Attorney

Patented June 1, 1948

2,442,406

UNITED STATES PATENT OFFICE 2,442,406

CONTROL CIRCUITS FOR ALTERNATING-CURRENT MOTORS

William O. Gates, Beverly, Mass., assignor to United Shoe Machinery Corporation, Flemington, N. J., a corporation of New Jersey Application November 15, 1946, Serial No. 710,029

9 Claims. (318—30)

1

This invention relates to alternating current motor control circuits and to servomechanisms employing such circuits. It is concerned more particularly with circuits for determining, in accordance with a control voltage, the direction of rotation, the torque and the action in stopping at selected positions of motors of the class exemplified by the so-called "split-phase" induction motor.

In this class of motors the turning moment and the direction of rotation may be controlled in accordance with the intensity and the phase respectively of a control field relative to what may be termed a "reference field" in the motor. Inasmuch as applicant's invention has been illustratively described by reference to the split-phase type motor it will be well to indicate the principles of operation of this motor for ease in describing the invention, as follows. Rotation of the motor armature occurs when there is a rotating magnetic field set up in the armature by the effect of currents flowing respectively in the two field windings of the motor, the reference field winding and the control field winding. The direction of rotation of the armature is the same as that of the field and, for a predetermined load, the armature torque depends upon the intensity of the rotating field. In order to establish such a field in the armature, in the construction of the motor the field windings are arranged at an angle, usually a right angle, in space with respect to each other, and in the use of the motor these windings are respectively energized with out-of phase alternating currents of the same frequency, preferably currents bearing a 90 degree phase relationship. From these currents a magnetic field is thus established in the interfield space occupied by the armature which will rotate at the frequency of the alternating currents, and the amplitude of the rotating field will be proportional to the smaller of the currents, the control field winding current. The reference field, carrying the larger amount of current, may be seen, therefore, incidentally to produce a resultant stationary field component, as well as a component of the rotating field, and the intensity of this stationary component will be proportional to the difference in amplitude of the said currents. If the phase of one of the currents is shifted by 180 degrees, the rotating field is reversed in direction thereby reversing the motor. By reducing the amplitude of the smaller of the currents the motor torque will be correspondingly reduced and if one of the currents is reduced to zero the motor will come to rest. Furthermore,

2 by effectively short circuiting one of the field windings the motor is subjected to a dynamic braking action in accordance with well-known principles of magnetic induction.

The motor control circuit of the invention has been described herein as applied to a system of control embodying a servomechanism of the type using transmitter and receiver Selsyn devices, the latter producing a control voltage which is representative of a movement to be executed by the motor. In this important application of the invention, the motor is connected to the rotor of a receiver Selsyn, either directly or through gearing, to produce power for driving a load and the movements of the motor corresponding to fractional turns of the receiver Selsyn are governed by the control circuit of the invention which depends for its operation upon a control voltage received from the rotor winding of such Selsyn. The amplitude and phase of this voltage will vary in accordance with the amount and direction of the difference in position between the receiver and transmitter Selsyn rotors and will be utilized in determining turning moment and the direction thereof in the motor. In the conventional manner, the initial control information is fed to the system by turning the rotor of the transmitter Selsyn and the receiver Selsyn rotor is thereby caused to follow this movement.

One of the outstanding difficulties in systems of control of this type has been in so controlling the operation of the motor that the hunting effect is minimized without sacrificing the sensitivity of response in the servomechanism to the control voltage. While this difficulty has been effectively overcome in many previous proposals the additional circuit components required thereby often were objectionable and there has thus remained a demand for a simple and reliable circuit of the foregoing type. Moreover, many of the former systems involved the use of vapor-type vacuum tubes such as thyratrons for generating the control current and in some industrial and other applications this has been found to be disadvantageous for reasons which are known in the art.

It is accordingly an object of the invention to provide a simplified motor-control circuit responsive to a control alternating voltage, which will minimize the hunting effect without sacrifice of the responsiveness of the circuit to such control voltage.

Another object is for the provision of a new and useful control circuit for motors of the type described, in which the control alternating current for the motor will be derived from means other than vapor type vacuum tubes and in response to a control voltage such as that produced by a receiver Selsyn in a servomechanism.

A feature of the invention resides in a control circuit responsive to a control alternating voltage, in which a control alternating current related in phase to said voltage is supplied to the motor when said voltage exceeds a predetermined low value and at other times the motor is dynamically braked, the circuit embodying relay switching means of a type adapted for operation at commercial power frequencies, that is, in the order of 60 cycles per second. Another features resides in a control circuit of the type just set forth in which additionally the amplitude of said control alternating current is related directly to the amplitude of the control voltage. A further feature comprises a control circuit in which such relay switching means, essentially of the single pole type, is responsive to a control alternating voltage and is employed in producing a control alternating current for a motor from a source of direct current, said source being arranged in a circuit with the motor and said switching means so as to provide direct current in a single direction. In this connection a condenser is provided in the circuit which stores a charge during the flow of said direct current and discharges at other times to provide a reverse current to the motor, the currents flowing alternately, to the end that a control alternating current is thereby provided to the motor, as aforesaid.

Figure 2:
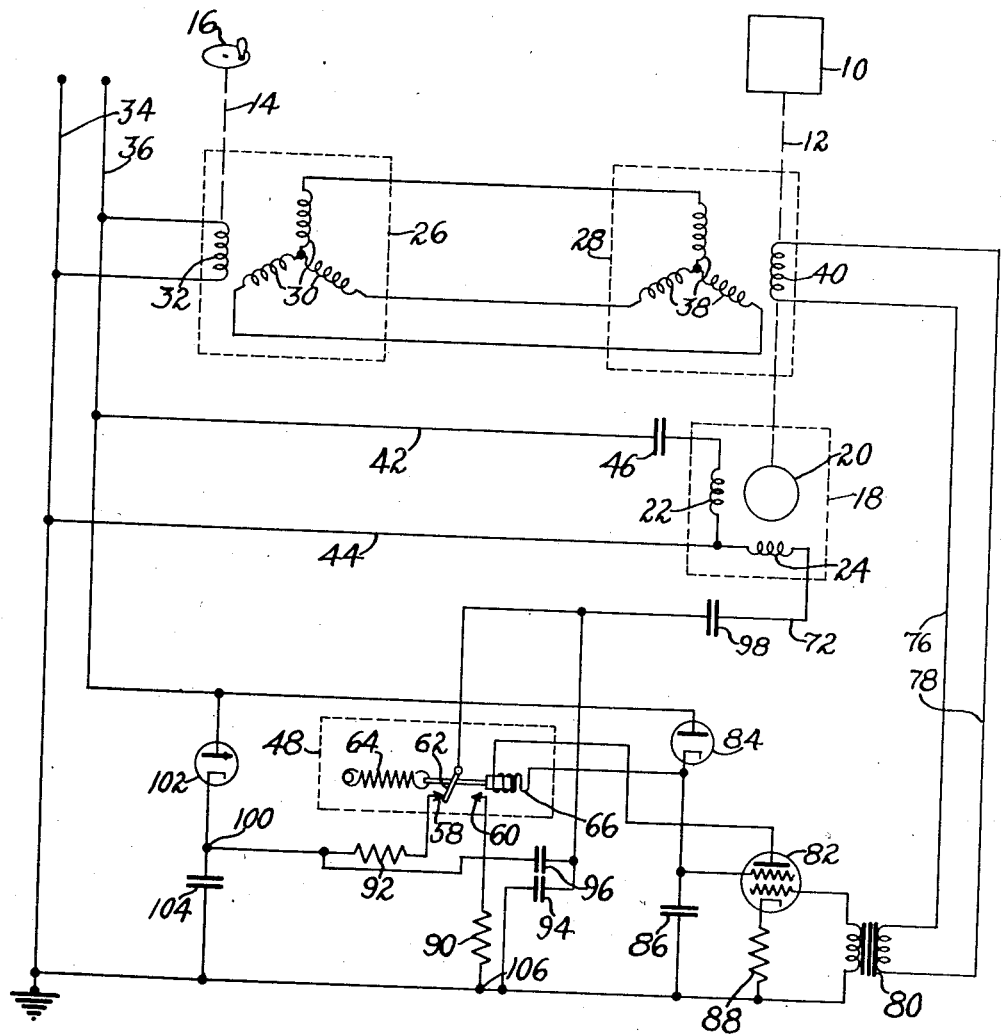
Figure 3:
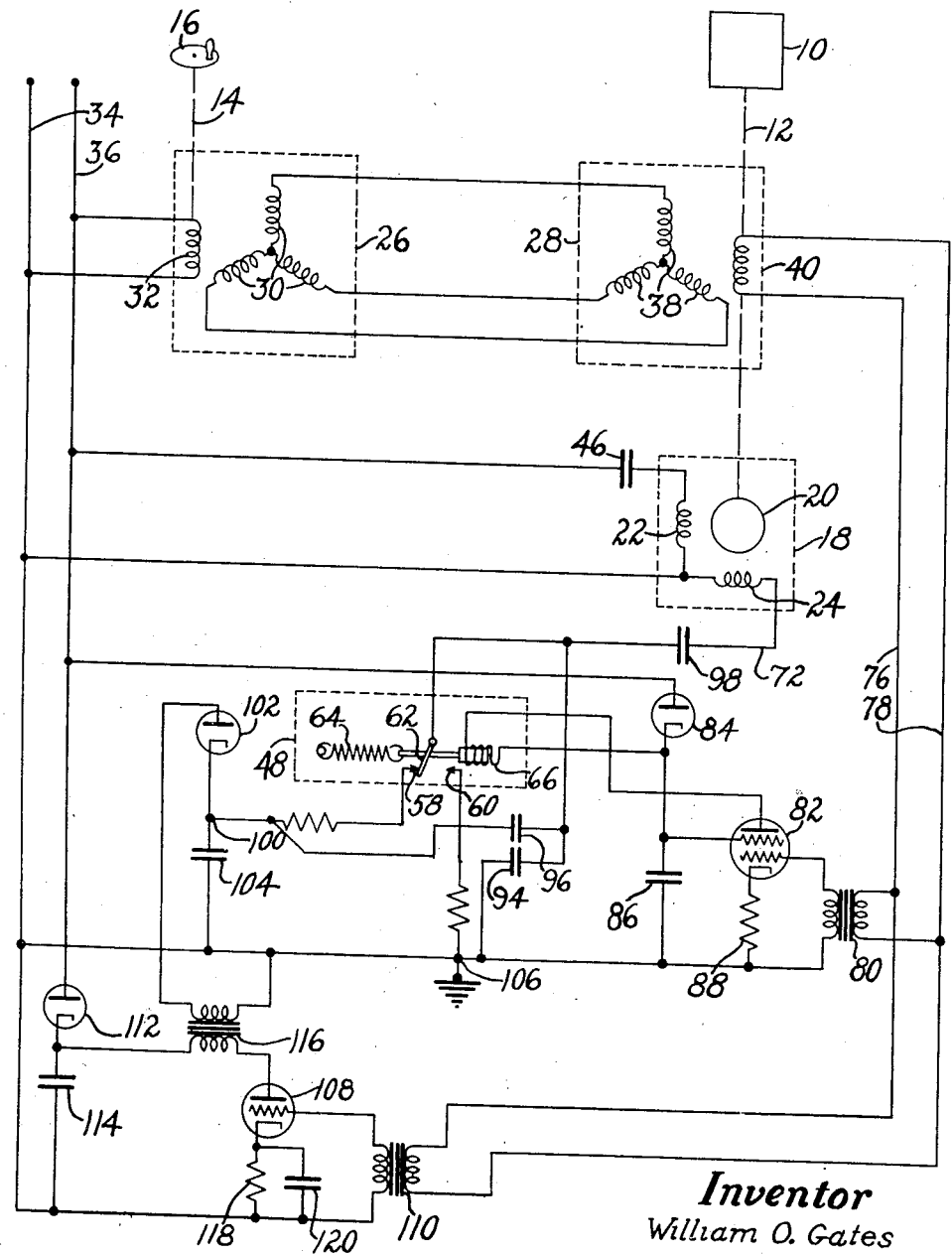

These and other features, objects and advantages of the invention will now be more fully described by reference to the accompanying drawings, in which Fig. 1 illustrates a control circuit of the type in which the control field winding derives current from a direct current circuit having points of opposite polarity;

Fig. 2 is a diagram of a circuit of a type in which the control alternating current for the control field winding is derived from a direct current circuit providing current in a single direction and from a condenser for producing a reverse current, the condenser being resonant with the control field winding inductance; and Fig. 3 is a diagram of a circuit related to that of Fig. 2 in which additionally the control alternating current supplied to the control field winding is made proportional in amplitude to the amplitude of a control voltage.

With reference to Fig. 1 and in the system of control shown therein, a load device 10, which may comprise any one of a variety of mechanical devices, is to be turned by a shaft 12 in accordance with the movements of a remote shaft 14 turned by control means such as a handle 16. The driving power to turn the shaft 12 is to be supplied by a motor 18 having an armature 20, a reference field winding 22 and a control field winding 24.

Selsyn devices 26 and 28, transmitter and receiver respectively, are employed in the conventional manner to convert the physical movements of the shaft 14 into electrical information in the form of a control voltage which may be utilized in controlling the actions of the motor. The transmitter Selsyn 26 comprises stator windings 30 and a rotor having a winding 32 connected to the shaft 14 and energized from alternating current supply mains 34 and 36 which may be connected to a 60-cycle per second commercial power line. The main 34 is grounded. In the receiver Selsyn 28 there is reproduced by means of stator field windings 38 an alternating field which conforms in amplitude and position to the field produced by the rotor winding 32 of the transmitter Selsyn 26. To this end corresponding sections of the windings 30 and 38 are connected together in the manner shown. The rotor winding 40 is mechanically coupled to the shaft 12 and, by virtue of the field produced by the stator windings 38, there is set up at its terminals an induced voltage which has been termed herein as "control voltage" or "control alternating voltage," the amplitude and phase of which represent the amount and direction of the positional difference between the shafts 12 and 14. The phase of this error voltage in the rotor winding 40 is taken in this description in its relation to the phase of the alternating voltage of the mains 34 and 36. The manner of utilizing the control voltage will be later described.

Referring further to the motor 18, the reference field winding 22 is arranged physically relative to the control field winding 24 to produce a field in the armature 20 which is at right angles in space with the field produced by the winding 24. The winding 22 is supplied with reference alternating current through leads 42 and 44 which are connected to the mains 34 and 36. In order to produce a phase-shifted component of current in the winding 22 relative to current in the control winding 24 for producing a rotating field in the armature 20, a series connected phase-shifting condenser 46 is provided in the lead 42 which shifts the phase of the current in the winding 22 by approximately 90 electrical degrees relative to the voltage of the mains 34 and 36. In thus producing a rotating magnetic field in the armature 20 of the motor 18 it will be apparent that a control alternating current must be established in the control field winding 24 which is approximately either in phase of 180 degrees out of phase with the alternating voltage carried by the mains 34 and 36. The manner in which this is accomplished utilizing the control voltage in the control circuit along with the construction and operation of such circuit will now be described.

The principal elements of the control circuit include a relay switching device 48, shown schematically, a direct current circuit comprising oppositely disposed rectifiers 50 and 52 and filter condensers 54 and 56, and means for producing a pulsating direct current for actuating the relay means 48 in accordance with the condition of the control voltage induced in the Selsyn rotor winding 40. The relay switching device 48 comprises a pair of switching contacts 58 and 60, a switching member 62 which, by means of a spring 64, is normally held against one of the contacts, 58, and is adapted to be oscillated between the contacts 58 and 60 upon the supply of a pulsating direct current to a relay coil 66 and at the frequency of the pulsations of such current. The contacts 58 and 60 are connected as shown to the filter condensers 54 and 56, at points 68 and 70 respectively, which are points of opposite polarity in accordance with the indicated polarities of the rectifiers 50 and 52. Supply voltage for the rectifiers is derived from the mains 34 and 36. The control field winding 24 of the motor 18 is connected to the switching member 62 of the relay 48 by a lead 72, through a series coupling condenser 74 which, in this circuit, is of a size to serve only as a D. C. blocking condenser. When the switching member 62 is oscillated back and forth between the contacts 58 and 60, therefore, an alternating voltage is applied to the control field winding 24 which has positive and negative peak amplitudes in accordance with the voltages appearing at points 68 and 70 in the direct current circuit just described.

For the purpose of oscillating the switching member 62 between the contacts 58 and 60 a pulsating direct current is supplied to the relay coil 66, as mentioned, and this is derived in accordance with the phase and amplitude of the control voltage developed in the rotor winding 40. The winding 40 is connected by means of leads 76 and 78 to the primary winding of a transformer 80 the secondary winding of which is connected to the first control grid of a multigrid amplifier tube 82 having, in addition to the first control grid, a second control grid, a cathode and an anode. Anode voltage for the tube 82 is supplied from a circuit comprising a diode rectifier 84 and a filter condenser 86, the anode current flowing through the relay coil 66 as shown. Bias voltage for the second control grid of the amplifier 82 is derived from the same source, and a cathode bias, which introduces negative feedback in the amplifier to limit the peak pulsation amplitude to suit the relay 48 requirements, is provided by the insertion of a resistor 88 in the cathode return lead of the tube 32. In operation, the tube 82 produces pulsating direct current in the relay coil 66, therefore, the pulse peaks occurring in phase with the positive peaks of the control alternating voltage applied to the first control grid of the tube and of proportional amplitude. If the phase of the control voltage shifts by 180 degrees, as it might when the rotor 40 of the receiver Selsyn 28 passes from one side of the correspondence position relative to the rotor 32 of the transmitter Selsyn 26 to the other side of such position, the phase of the pulsations of current in the coil 66 will likewise change and consequently the phase of the control alternating current flowing in the control field winding 24 is reversed, thereby reversing the motor.

With further reference to the operation of the relay switching means 48 it will be apparent that, in order to produce an oscillation of the switching member 62, a direct current in the relay coil 66 must be established which is in excess of a certain minimum value necessary to overcome the force of the spring 64 normally holding the switching member 62 against the contact 58. Therefore, when the control voltage is substantially zero, and likewise the direct current pulsations in the coil 66, no switching action takes place in the relay and a low impedance circuit is provided across the control field winding 24, the impedance value being taken at the frequency of operation of the motor. The low impedance circuit includes the large coupling condenser 74, element 90 of two low resistance elements 90 and 92, which are provided to protect the relay against short circuit currents during the switching action thereof, and the filter condenser 54. The effect is substantially to short circuit the control field winding 24 and to produce dynamic braking action in the motor 18 if it is in motion. This characteristic of the circuit is an important feature of the invention since it minimizes the hunting effect of the motor, for it may be seen that when the motor, during selected periods, in driving the shaft 12 toward a new correspondence position with the shaft 14 in accordance with the existence of a control alternating current in the control field winding 24, a point will be reached just in advance of such position whereat the control voltage becomes insufficient to continue causing oscillation in the relay 48, whereupon the switching member 62 of the relay will return to and be retained against the switching contact 58 to provide dynamic braking for the motor. The motor will thus be prevented from seriously overshooting the correspondence position and the hunting tendency reduced.

Relays of a type suitable for performing the function of the relay switching means 48 are available commercially. The relay No. D-168479 manufactured by the Western Electric Company is preferred for this purpose. To protect the relay contacts from excessive wear and to improve the switching action, small condensers 94 and 96 are connected between the relay contacts and the switching member 62, and, as previously stated, current limiting resistors 90 and 92 are desirable to limit short circuit current flowing between the contacts 58 and 60 in the event an arc is struck therebetween. The representation of the relay components in the drawing is symbolic only, and, in the Western Electric relay referred to, an arc of this character between the contacts may occur owing to the fact that a mercury type switch is utilized.

In Fig. 2 a modified control circuit has been substituted in the general control system shown in Fig. 1. In the circuit of Fig. 2 control alternating current is derived from a source adapted for producing direct current in a single direction and a condenser for storing a charge during the flow of such current and for producing a reverse current at other times. Such a condenser, indicated as condenser 98, in the figure preferably is of such a size as to act in resonance with the inductance of the control field winding 24. In this instance the relay contact 58 is connected to point 100 in a direct current supply circuit comprising a rectifier tube 102 and a filter condenser 104 connected across the mains 34, 36, whereas the contact 60 is connected to ground potential at point 106. When the relay switching member 62 is oscillated between the contacts 58 and 60 the effect is first to charge the condenser 98 with the flow of current through the control field winding 24 during the time the member 62 is against the contact 58 and then, when the member 62 is against the contact 60, to discharge the condenser 98 through the field winding 24 to ground, with the current now flowing in the opposite direction. This constitutes the alternating current required in the control field winding 24, and by producing resonance between the condenser 98 and the inductance of the winding 24 the wave shape of the alternating current is improved. Fewer circuit elements are therefore required in this circuit relative to those required in the circuit of Fig. 1 and the control alternating current flowing in the control field winding 24 is conformed more nearly to a sine wave, which may be a desirable feature in some applications of the invention.

In the circuit of Fig. 3 the additional feature over that just described with reference to Fig. 2 is provided of regulating the amplitude of the control alternating current in accordance with the amplitude of the control voltage generated in the rotor winding 40 of the receiver Selsyn 28. In providing for this feature a rectifier tube 102 is in this instance impressed with an alternating voltage which is proportional to the amplitude of the control voltage. This is attained with the aid of an amplifier tube 108 having a control grid which receives voltage from the secondary winding of a transformer 110, the primary of which is supplied from the rotor 40 of the receiver Selsyn 28. Plate voltage for the amplifier 108 is derived from the mains 34 and 36 through a rectifier 112 and a filter condenser 114. The primary winding of a plate transformer 116 is connected in the anode circuit of the tube 108 and the secondary winding of this transformer is grounded at one terminal and at the other is connected to the anode of the rectifier 102. A resistor 118 and a condenser 120 are employed in the cathode circuit of the tube 108 to provide appropriate cathode bias for efficient operation of the tube 108. It will be apparent, therefore, in the operation of this portion of the circuit, that the direct voltage appearing at point 100 in the direct current circuit comprising the rectifier 102 and the filter condenser 104 is proportional to the control voltage. The condenser 98 being resonant with the winding 24, the alternating current produced in the control field winding 24 will be substantially sinusoidal, will be of a phase determined by the phase of the control voltage, and will be of an amplitude proportional to the amplitude of the control voltage.

In the operation of the system of Fig. 3, as the motor 18 operates to reduce the positional difference between the shafts 12 and 14 the control voltage will become proportionally smaller and the motor torque will be accordingly reduced, thereby lowering the motor speed gradually such that the tendency to overshoot the correspondence position will be correspondingly lowered. Combining with this the dynamic braking effect provided by the relay means 48, the tendency to overshoot and thus to hunt is thereby greatly reduced.

While the invention has been described in connection with three of its embodiments, in its most general nature, it is to be understood that various modifications and changes may be made in the parts used or in the arrangement of the parts without departing from the essential features of the invention.

Having thus described my invention, what I claim as new and desire to secure by Letters Patent of the United States is:

1. In apparatus of the class described, the combination comprising an alternating current motor having an armature, a reference field winding adapted for carrying a reference alternating current to produce a reference field and a control field winding at an angle in space arranged for the production of a control field at an angle in space relative to said reference field to said first field winding; and control means for supplying control alternating current to said control field winding, said means comprising means for producing two direct voltages of opposite polarity, said producing means having a low internal impedance, relay means constructed and arranged for connecting said control field winding alternately to receive said direct voltages from said producing means, said relay means including a pair of switching contacts, a switching member with spring means for urging said member normally against one of said contacts and a field coil arranged, when energized with current of a predetermined magnitude, for moving said switching member between said contacts, and means for supplying to said field coil at selected periods a pulsating direct current above said magnitude, the pulsations occurring at the frequency of said reference alternating current and bearing a controlled phase relationship thereto to cause the movement of said member between said contacts at the pulsation frequency, whereby the direction of rotation of said motor during said periods is determined by the said phase relationship of said pulsations and at the end of each of said periods a low impedance is connected across said control field to cause dynamic braking action in said motor.

2. Apparatus in accordance with claim 1 in which said pulsating direct current supply means comprises a vacuum tube amplifier having an anode connected to said field coil and a control grid arranged for the application thereto of a control alternating voltage of controlled phase.

3. In apparatus for the control of an alternating current motor of the type having a reference field winding and a control field winding, said windings being so arranged that the phase relationship of alternating currents in said windings will determine the direction of rotation of said motor, the combination comprising low impedance means for producing a pair of direct voltages of opposite polarity, relay switching means and control means for the latter arranged for applying said voltages to said control field winding alternately to produce a control alternating current therein during selected periods, said relay means including a pair of switching contacts, a field coil, a switching member adapted to be moved between said contacts with the flow of current in said field coil above a predetermined magnitude, and spring means normally urging said member against one of said contacts, said control means being adapted for producing in said field coil during said selected periods a pulsating direct current above said magnitude and at the frequency of operation of the motor to cause said switching member to move between said contacts alternately at said frequency, said control means being adapted for determining the phase of said pulsations relative to the phase of alternating current in said reference field winding to control the direction of rotation of said motor during said periods while at the end of said periods dynamic braking occurs in said motor as a result of the connection of said control field winding across the low impedance of said direct voltage producing means.

4. In a servomechanism including a Selsyn transmitter and a Selsyn receiver arranged for producing an alternating voltage of a phase representative of the direction of the positional displacement of the receiver Selsyn rotor relative to the transmitter Selsyn rotor, the combination comprising an alternating current motor arranged for driving said receiver Selsyn rotor and having a reference field winding with means for passing alternating current therethrough; a control field winding for said motor adapted, in accordance with the phase of a control alternating current therein relative to the current in said first field winding, for determining the direction of rotation of said motor; means for producing direct voltages of opposite polarity, said means having low internal impedance; relay switching means and connecting means arranged for applying said voltages to said control field winding alternately to produce a control alternating current in said winding, said relay switching means having two switching positions, a switching member normally held in one of said positions, and a field coil means adapted to cause said member to oscillate between said positions in accordance with pulsating direct current supplied to said coil in excess of a predetermined magnitude; amplifier means responsive to said alternating voltage for supplying pulsating direct current to said field coil means, whereby said alternating control current is phase related to said alternating voltage and when said alternating voltage is substantially zero a low impedance is connected across said control field winding to produce dynamic braking in said motor.

5. In apparatus of the class described, the combination comprising an alternating current motor to be controlled, said motor having an armature, a reference field winding for producing a reference alternating field and a control field winding for producing a control alternating field arranged at an angle in space relative to said first winding; control means for supplying control alternating current to said control field winding comprising a source of direct voltage having two terminals one of which is connected to one side of said control field winding; relay switching means having a first contact connected to the other terminal of said source, a second contact connected to said side of said control field winding, spring means and a switching member normally retained thereby against one of said contacts, said switching member having connection to the other side of said control field winding, and a relay coil cooperative with said switching member and adapted to cause oscillation of said member between said contacts in accordance with a pulsating direct current flowing in said relay coil, a coupling condenser connected in series with said control field winding and said relay means, and means for supplying to said relay coil pulsating direct current of a pulsation frequency equal to the frequency of said reference alternating field and of a controlled phase relative thereto, during selected intervals thereby to cause said motor to rotate in a controlled direction during said intervals and, following said intervals, to have applied thereto dynamic braking resulting from the flow of current in said control field winding through said relay switching member and one of said contacts.

6. Apparatus as in claim 5 wherein said coupling condenser is made resonant with the inductance of said control field winding at the frequency of said control alternating current.

7. In apparatus for the control of an alternating current motor, the combination for producing in a control field winding of said motor an alternating current of controlled phase, comprising a source of direct current having one terminal connected to one side of said winding; relay switching means having a first contact connected to the other terminal of said source, a second contact having connection with said side of said winding, a switching member with spring means normally for retaining said member against one of said contacts, said member having connection with the other side of said winding, a relay coil arranged, when impressed with a pulsating direct voltage, for causing oscillation of said member between said contacts to produce an alternating current in said winding of the frequency of the pulsations of said direct voltage; condenser means connected in series with said winding and said switching member and resonant with said winding at the frequency of said alternating current; and means for supplying to said relay coil pulsating direct voltage of controlled phase.

8. In apparatus of the class described, the combination comprising a control field winding for an alternating current motor and means for supplying an alternating current of selected frequency and of controlled phase to said winding, said means comprising direct current means having points of different potential, switching means for connecting said points to said field winding alternately, condenser means arranged in series connection with said winding and said switching means, electromagnetic means for actuating said switching means in accordance with a pulsating direct current, and means responsive to control alternating voltage of a selected frequency and of controlled phase for supplying to said electromagnetic means a direct current having pulsations corresponding in frequency and phase to said control alternating voltage.

9. Apparatus according to claim 8 in which said series condenser is made resonant to the inductance of said winding.

WILLIAM O. GATES.